United States Patent
Reichardt et al.

[11] Patent Number: 5,814,805
[45] Date of Patent: Sep. 29, 1998

[54] CHIP-CARD READER

[75] Inventors: Manfred Reichardt, Weinsberg; Martina Tolksdorf, Sontheim, both of Germany

[73] Assignee: Amphenol-Tuchel Electronics GmbH, Heilbronn, Germany

[21] Appl. No.: 687,997

[22] Filed: Jul. 29, 1996

[30] Foreign Application Priority Data

Jul. 27, 1995 [DE] Germany .......................... 195 27 519.5

[51] Int. Cl.[6] .................................................. G06K 13/04
[52] U.S. Cl. .......................... 235/479; 235/439; 235/440; 235/441
[58] Field of Search ..................... 235/439, 440, 235/441, 479

[56] References Cited

U.S. PATENT DOCUMENTS

| | | |
|---|---|---|
| 4,602,351 | 7/1986 | Shimamura et al. . |
| 4,743,746 | 5/1988 | Murschall et al. . |
| 4,752,234 | 6/1988 | Reichardt et al. . |
| 4,814,593 | 3/1989 | Reichardt et al. . |
| 4,870,604 | 9/1989 | Tatsuno . |
| 4,932,889 | 6/1990 | Bleier et al. . |
| 5,012,078 | 4/1991 | Pernet . |
| 5,320,552 | 6/1994 | Reichardt et al. . |
| 5,369,259 | 11/1994 | Bleier et al. . |
| 5,382,781 | 1/1995 | Inoura ...................................... 235/440 |
| 5,550,361 | 8/1996 | Huis et al. . |

FOREIGN PATENT DOCUMENTS

| | | |
|---|---|---|
| 0 520 080 | 12/1992 | European Pat. Off. . |
| 2 250 846 | 6/1992 | United Kingdom . |
| WO 91/04548 | 4/1991 | WIPO . |

*Primary Examiner*—Harold Pitts
*Attorney, Agent, or Firm*—Bacon & Thomas

[57] ABSTRACT

The present invention is directed to a SIM card reader which is especially adapted to be mounted in a device such as a telephone. To obtain a contact or contact engagement in the reading position between the card contacts and the reading contact elements transport or moving means for said card are provided which bring the card contacts and the contact elements into contact with each other. Preferably, the card together with its card contacts is moved by said transport means towards the stationary reading contact elements, without causing a relative movement between the card contacts and the contact elements. The transport means comprises card receiving means (receptacle) and actuating means.

20 Claims, 2 Drawing Sheets

CHIP-CARD READER

The present invention relates to a so-called chip-card reader, i.e. a contacting apparatus for a chip-card. In particular the invention relates to a SIM-card reader, i.e. a contacting apparatus for a SIM-card. SIM-cards are for example used in mobile phones. As is well known, SIM stands for "subscriber identity module". The invention relates more specifically to a SIM-card reader having means for locking the SIM-card in its so-called reading position. This reader might be called a SIM-lock (reader).

Thus, even though the present invention relates generally to a chip card reader, the present invention is described below with respect to a SIM-card reader in which the invention is preferably used.

BACKGROUND ART

Numerous types of SIM card readers are known. For example, the Japanese laid-open publication 60-173789 shows a substrate, which is inserted into a housing, and a memory card in a holding plate can be pivoted towards a contact provided in the substrate.

Known SIM-card readers are typically mounted in devices such as telephones. At a given time, a SIM-card is inserted into the SIM-card reader and the contacts of the SIM-card (card contacts) are brought into contact with contact elements (also called reading contact elements) provided in the SIM-card reader. In such a chip-card reader the contact engagement between the contact elements of the chip card reader and the card contacts is achieved by a pivoting movement during which the chip-card containing the card contacts is lowered towards the contact elements.

Also, SIM-card readers are known wherein a relative movement other than a pivotal lowering movement between the reader and the card contacts occurs.

SUMMARY OF THE INVENTION

It is an object of the present invention to provide a SIM card reader (or a chip card reader in general), which overcomes the disadvantages of the prior art. Preferably one or more of the following objects is/are obtained.

The SIM-card reader should provide a contact engagement between the reading contact elements and the card contacts without causing a relative movement therebetween. The SIM-card reader should preferably be of the "insert-" type.

Typically the SIM-card reader comprises an opening for insertion of the SIM-card into the reader. Said card opening should be arranged preferably close to or at a casing wall of a device in which the SIM-card reader is employed, such as a telephone. The card opening Should be easily accessible for the insertion of the SIM-card, i.e. the arrangement should for example not be underneath a battery pack of the device.

The card opening should preferably be substantially closed or looked during an active or reading condition of the reader. Further, the contact elements of the SIM-card reader should preferably be adapted for SMT (Surface Mounted Technology)-connections. Also, a card presence and/or a card abutment switch (card and position switch) may be provided. Said switch is preferably one which is closed when the card is in the reading or end position.

Preferably a card removal or ejection element is provided which is not detachable from the reader and thus cannot be lost.

In accordance with the present invention a SIM card reader is provided which is especially adapted to be mounted in a device such as a telephone. To obtain a contact or contact engagement in the reading position between the card contacts and the reading contact elements transport or moving means for said card are provided which bring the card contacts and the contact elements into contact with each other. Preferably, the card together with its card contacts is moved by said transport means towards the stationary reading contact elements, without causing a relative movement other than a pivotal lowering movement between the card contacts and the contact elements. The transport means comprises card receiving means (receptacle) and actuating means.

Said, actuating means (e.g. an excentric means) can preferably be operated from outside the housing (e.g. by an actuator) to bring the SIM-card from an inactive or insert position into the reading position.

The SIM card can be inserted into said card receiving means (receptacle). Said insertion of the SIM-card into said receiving means is preferably achieved through a slot in the wall of the housing of the device in which the SIM-card reader is mounted. After the SIM-card is received in the card receiving means the user preferably actuates the actuator to operate the actuating means. Via said actuating means the card receiving means together with the SIM-card is moved towards the preferably stationary reading contact elements of the SIM-card reader. This movement may preferably be a pivotal movement.

In accordance with another preferred embodiment of the invention the movement of the SIM-card towards the contact elements is a translational movement perpendicular to a plane defined by the card contacts and contact elements, respectively. The insertion of the SIM-card into the card receptacle can occur in longitudinal direction (i.e. lengthwise of the SIM-card), or in a transverse direction of the SIM-card. After insertion, the lowering movement of the SIM-card towards the contact elements occurs, by means of said actuating means.

Disengaging the card and the contact elements is achieved by operating the actuator in such a manner that the card receptacle is moved back to its initial or card insert position, preferably by the actuating means. The easiest way to remove the SIM-card after disengagement of said contacts would be to turn the device upside down such that the SIM-card falls out of the receptacle and the device due to gravity.

In accordance with a preferred embodiment of the invention card ejection means are provided which are preferably triggered by the actuator or the actuating means after the card receptacle (or any other means for bringing the contacts together) has been moved into the initial or insert position. The SIM-card can, for example, be ejected by the force of a spring.

Further, means can be provided to close or lock the insertion slot in the housing of the device and/or the insertion opening in the SIM-card reader when the actuator and the actuating means, respectively, have moved the SIM card into the reading position.

In accordance with a preferred embodiment of the invention SMT-contact elements are used in the SIM-card reader. In accordance with a further embodiment of the invention a so-called standard SIM block is used which is arranged in a support means of the SIM-card reader, thus defining a chip card reader.

BRIEF DESCRIPTION OF THE DRAWINGS

Additional advantages, objects and details of the invention can be recognized from the description of embodiments of the invention referring to the attached drawing.

Referring to FIG. 1 a device or apparatus 11 such as a telephone apparatus is shown. A chip card reader preferably a SIM-card reader 10 is provided within the device 11. The SIM-card reader 10 is preferably arranged in said apparatus 11 such that a SIM-card 1 can be inserted into the reader 10 from the outside of said apparatus 11. To facilitate said insertion of the SIM-card 1 a slot 2 or the like is provided in the housing (or a wall) of the device 11. The slot 2 is aligned with an insertion or receiving opening 4 (FIG. 6) of the SIM-card reader 10.

FIG. 1 shows transport or moving means comprising actuating means 18 and card receiving means (receptacle) 14 for moving the card 1 inserted into receptacle 14 (shown in FIG. 5) with its card contacts (30 in FIG. 2) into engagement with contact elements (21 in FIG. 4) of said SIM card reader 10. This movement occurs after insertion of the SIM card from an initial or card insert position (FIG. 3, 4) to a card contact or reading position (FIG. 5). An actuator 3 (FIG. 1) which is preferably accessible from the outside of the device 11 serves to activate the actuating means 18 to cause the movement of the receptacle 14 together with the SIM-card 1 from the initial position to the reading position. The actuator 3 and the actuating means 18, respectively, preferably are also adapted to move the SIM-card from the reading position back to the initial position to allow removal of the SIM-card 1 or to cause or allow the ejection of the card 1. The actuator 3 can transmit its movement for example via means 31 (FIG. 1) to the actuating means 18.

FIGS. 2 to 5 show an embodiment of the present invention in which the SIM-card reader 10 comprises a support or carrier 13 which can either support contact elements 21 itself or which, as shown, carries a so-called SIM-block 20 which in turn comprises said contact elements 21. Said SIM-block 20 is for example bonded to said support 13 e.g. by an adhesive. The contact elements 21 are preferably so-called SMT-(surface mounted technology) contacts, i.e. they can be soldered directly onto a printed circuit board of the device 11. Therefore, the contacts 21 comprise SMT-terminals 22. Further, contact cusps of the contact elements 21 are indicated by the reference signs 23.

In the shown embodiment the card receiving means 14 in the form of the card receptacle (or cover) 14 is pivotably connected by hinge or pivot means 15 to carrier 13. The receptacle 14 can be pivoted from the position shown in FIG. 4 to the position shown in FIG. 5. FIGS. 3 and 4 show the so-called initial or insert position of the card receptacle 14, i.e. the position in which the SIM-card 1 can be inserted first through slot 2 and then through the insertion opening 4 of the support 13 and into a receiving or slot means 200 of the receptacle 14. The shown design of the receptacle 14 requires a lateral insertion of the SIM-card 1, i.e. perpendicular to the plane of the drawing in FIG. 4. It is also possible to design the reader 10 such that the SIM-card 1 can be inserted in longitudinal direction of the SIM-card 1, e.g. from the left in FIG. 4.

Figure 3:
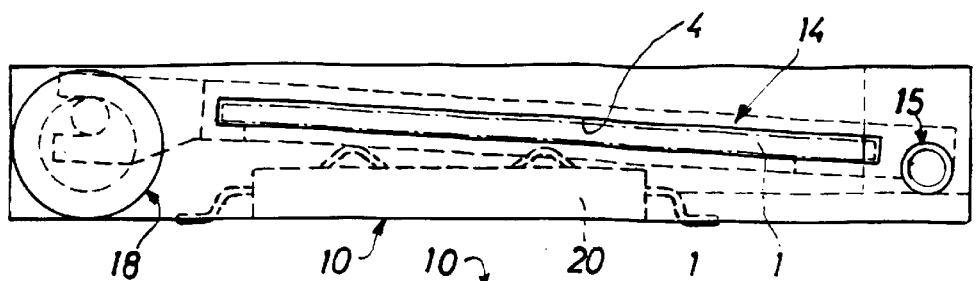
FIG. 3 shows a schematic side elevational view along line III in FIG. 2.
Figure 4:
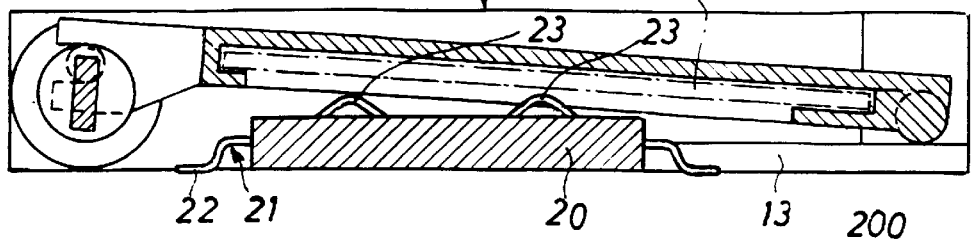
FIGS. 4,5 show schematic sectional views along line IV in FIG. 2 with FIG. 4 showing the SIM-card reader in its initial or inactive (or insert) position and FIG. 5 showing the SIM-card reader in its active or reading position.
Figure 5:
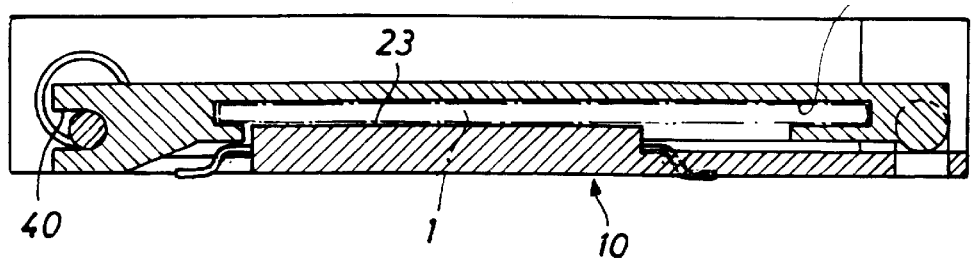

The movement of the card receptacle 14 from the initial position shown in FIG. 4 to the reading position shown in FIG. 5 is caused by said actuating means 18 which pivot the receptacle 14 from the position shown in FIG. 4 to the position shown in FIG. 5. In the shown embodiment the actuating means 18 are formed by rotatable means preferably an eccentric means 118 adapted to engage a slot 40 of the card receptacle 14. The actuating means 18 are provided at the carrier 13 opposite to the hinge means 14. The actuating means 18 comprise said eccentric means 118 and engagement means preferably in the form of said slot 40. The slot 40 extends parallel to the width of the receptacle 14. The slot 40 comprises two sections 40a 40b which are formed in protections 114a, 114b of the receptacle 14. The eccentric means 118 can be rotated about an axis of rotation 150. Two eccentric 150a and 150b are in engagement with said slot sections 40a and 40b, so as to cause (as is shown in FIGS. 3 to 5) the pivotal movement of the receptacle 14 between the insert and reading positions.

In accordance with the preferred embodiment of the invention the SIM card 1 is moved against the reading contacts.

As already mentioned above the actuating means 18 can be actuated from the outside of the device 11 by the actuator 3.

The SIM-card 1 is preferably inserted into the card receiving opening 4 of the SIM-card reader 10 using gravity. Then the SIM-card is moved together with the receptacle 14 into its reading position (i.e. by operating the actuating means 18). To remove the SIM-card the device 11 is turned such that the slot 2 and the opening 4 face downwardly so that the SIM-card 1 drops out of the device 11 (e.g. a telephone), provided that the receptacle 14 was brought back to its insert position. It is also possible to provide for card ejecting means adapted to eject the card from the receptacle, when it is returned to the position of FIG. 3.

Figure 2:
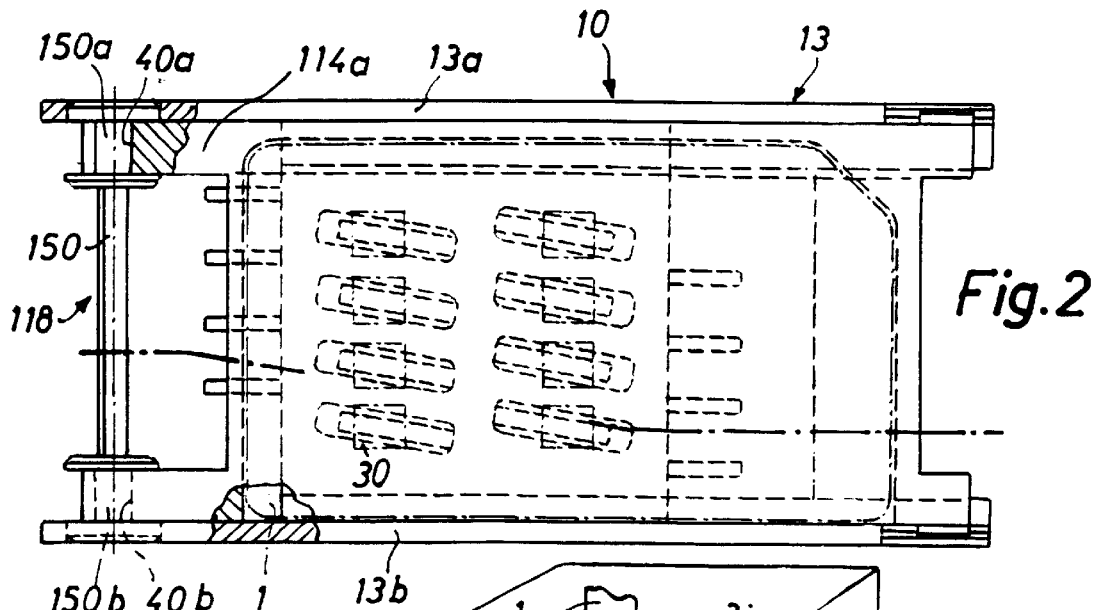
FIG. 2 shows a top plan view of a first embodiment of a SIM-card reader.
Figure 1:
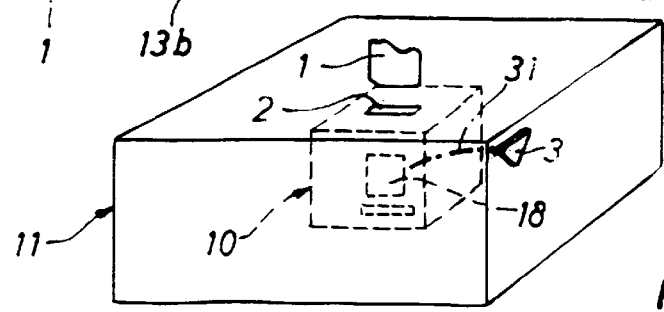
FIG. 1 shows a schematic representation of the present invention.
Figure 6:
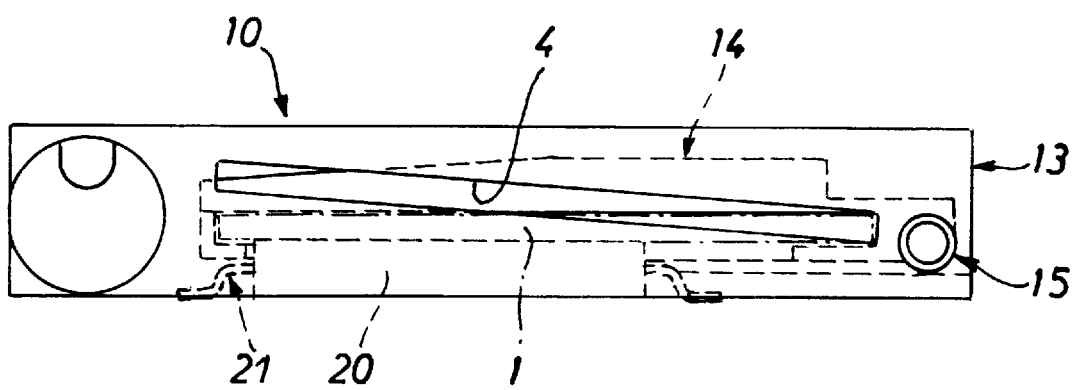
FIG. 6 shows schematically a side elevational view similiar to FIG. 5 but clearly disclosing the insertion opening.

As it is shown in FIG. 2 the support 13 comprises side walls 13a and 13b. The side wall 13b comprises a card insert slot 4. The card insert slot is in alignment with the receiving means 200 in the position shown in FIG. 3 so as to allow the insertion of the SIM-card 1 into the card receiving or slot means 200 of said receptacle 14. However, in the reading position shown in FIG. 5 the receptacle is closed or locked so that the inserted SIM-card cannot be removed from the opening 4 due to the fact, that there exists a different angular position of said insertion opening 4 slot in the wall 13b with respect to the receiving means 200 see FIG. 6. Also, in this "locking position" no new or other SIM-card can be inserted. Actually, the opening 4 has also the shape of a slot because it has to accommodate the SIM-card 1. The wall 13b thus provides for a Closing effect for the slot or opening 4. Such a closing effect can also be achieved by a different means for instance a wall or actually the housing of the device 11 for instance slot 2 in FIG. 2 could provide for said locking effect.

Generally speaking the invention provides for a SIM block comprising contact elements 21. Said SIM block 20 is provided with hinge or pivot means 15 as well as an actuating means for a hinged receptacle or cover 14.

Preferably the card is inserted parallel to the axis of rotation of the card receptacle as mentioned above. Therefore the position of the reader can be close to the periphery of the device 11.

The card receptacle can also be moved between the active and inactive position via an oblique plane of a linear actuator.

We claim:
1. A chip card reader comprising:
reading contact elements adapted to engage card contacts of said chip card in a reading position;
a receptacle into which said chip card is inserted; and
actuating means adapted to bring said card contacts and said contact elements into contact engagement by moving said receptacle, and therefore said chip card, towards said reading contact elements.

2. The chip card reader as set forth in claim 1, wherein the card (1) with its card contacts (30) is moved towards the contact elements (21).

3. The chip card reader as set forth in claim 1, wherein said actuating means (18) can be actuated from outside the device (11) by an actuator (3).

4. The chip card reader as set forth in claim 1, wherein the actuating means (18) cause closure of an insertion slot (2) provided within the housing of the device (11).

5. The chip card reader as set forth in claim 1, wherein the actuating means (18) comprises excenter means for bringing the card contacts (30) and the contact elements (21) into contact with each other.

6. The chip card reader as set forth in claim 1, wherein a card receptacle (14) is provided which is moved together with said card (1) from an initial position to a reading position by the actuating means (18).

7. The chip card reader as set forth in claim 1, wherein the removal of the SIM-card (1) from the chip card reader is achieved by gravity.

8. The chip card reader as set forth in claim 1, wherein the removal of the SIM-card (1) from the chip card reader is achieved by "ejecting means".

9. The chip card reader as set forth in claim 1, in which the receptacle (14) is pivotable and can be lowered onto the contacts elements via said actuating means.

10. The chip card reader as set forth in claim 1, wherein the contact between said card contacts (30) and said contact elements (21) is achieved without rubbing of said contacts.

11. The chip card reader as set forth in claim 1, wherein the chip card (1) is preferably secured in the reading position.

12. The chip card reader as set forth in claim 1, wherein the chip card (1) is preferably inserted in a direction parallel to the rotational axis of the card receptacle (14).

13. The chip card reader as set forth in claim 1, wherein the chip card (1) is preferably inserted perpendicular to the rotational axis of the receptacle (14).

14. The chip card reader as set forth in claim 1, wherein the actuation of the receptacle (14) is preferably achieved via excenter means or via a linear actuator.

15. A chip card reader adapted to be mounted in a device, said chip card comprising:
reading contact elements adapted to engage card contacts of said chip card in a reading position; and
a receptacle pivotally mounted so as to pivot about an axis and move the chip card towards said contact elements, and into which said chip card is inserted in a direction parallel to said axis such that when said receptacle is pivoted towards said contact elements, said chip card is locked in said device.

16. The chip card reader as set forth in claim 15, wherein said chip card is inserted into said receptacle through a slot, and when said receptacle is pivoted towards said reading contact elements, said slot is closed by a wall of said device.

17. The chip card reader as set forth in claim 16, further comprising actuating means adapted to bring said card contacts and said contact elements into contact engagement by moving said receptacle, and therefore said chip card, towards said reading contact elements.

18. The chip card reader as set forth in claim 17, wherein said actuating means comprises an eccentric member positioned to engage an end of said receptacle opposite said pivot axis, and operable from outside a housing of said device.

19. The chip card reader as set forth in claim 15, wherein said device is a telephone.

20. The chip card reader as set forth in claim 15, wherein said chip card is a SIM-card.

* * * * *